(No Model.) 2 Sheets—Sheet 1.

W. P. THOMPSON & P. VAN GELDER.
DUST COLLECTOR.

No. 522,769. Patented July 10, 1894.

Witnesses
C. B. Bull
D. W. Naylor

Inventors
Pieter Van Gelder
William P. Thompson,
by Dodge & Sons,
Attys.

(No Model.) 2 Sheets—Sheet 2.

W. P. THOMPSON & P. VAN GELDER.
DUST COLLECTOR.

No. 522,769. Patented July 10, 1894.

Witnesses
C. B. Bull
D. S. Naylor

Inventors
Pieter Van Gelder
William P. Thompson
by Dodge & Sons Attys.

UNITED STATES PATENT OFFICE.

WILLIAM PHILLIPS THOMPSON, OF LIVERPOOL, AND PIETER VAN GELDER, OF SOWERBY BRIDGE, ENGLAND; SAID VAN GELDER ASSIGNOR TO SAID THOMPSON.

DUST-COLLECTOR.

SPECIFICATION forming part of Letters Patent No. 522,769, dated July 10, 1894.

Application filed July 18, 1893. Serial No. 480,838. (No model.)

*To all whom it may concern:*

Be it known that we, WILLIAM PHILLIPS THOMPSON, of 6 Lord Street, Liverpool, in the county of Lancaster, and PIETER VAN GELDER, of Sowerby Bridge, in the county of York, England, have invented certain new and useful Improvements in Dust-Collectors, of which the following is a specification.

This invention has for its object an apparatus for separating dust from air on the vortex principle.

In an application now pending, Serial No. 462,625, we have shown a plan for a cylindrical separator with a central exit for dust. This acts well for light dust, but for very heavy dust it is apt to choke up. Now our present invention is designed to overcome this evil. In place of a central orifice, we have an annular orifice. It is best described by aid of the accompanying drawings, in which—

Figure 1:
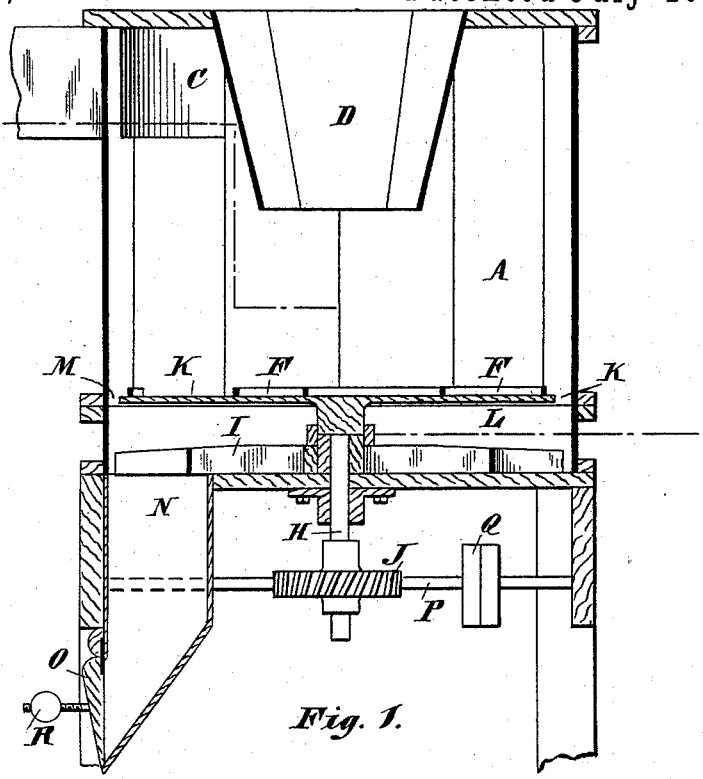
Figure 2:
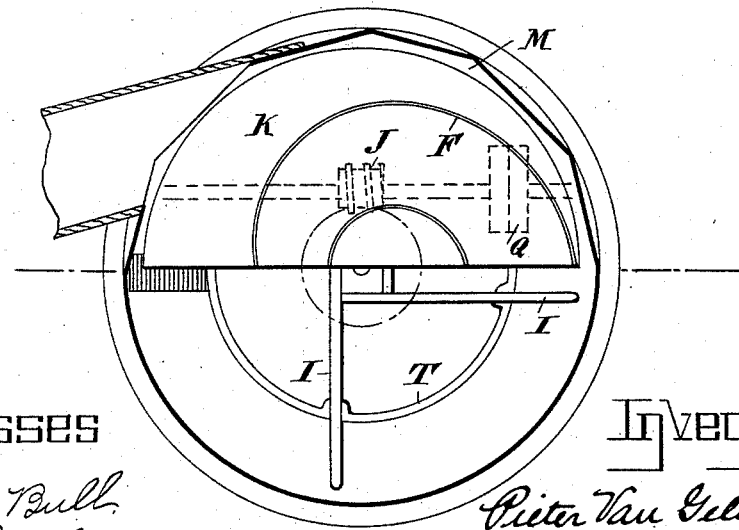
Figure 3:
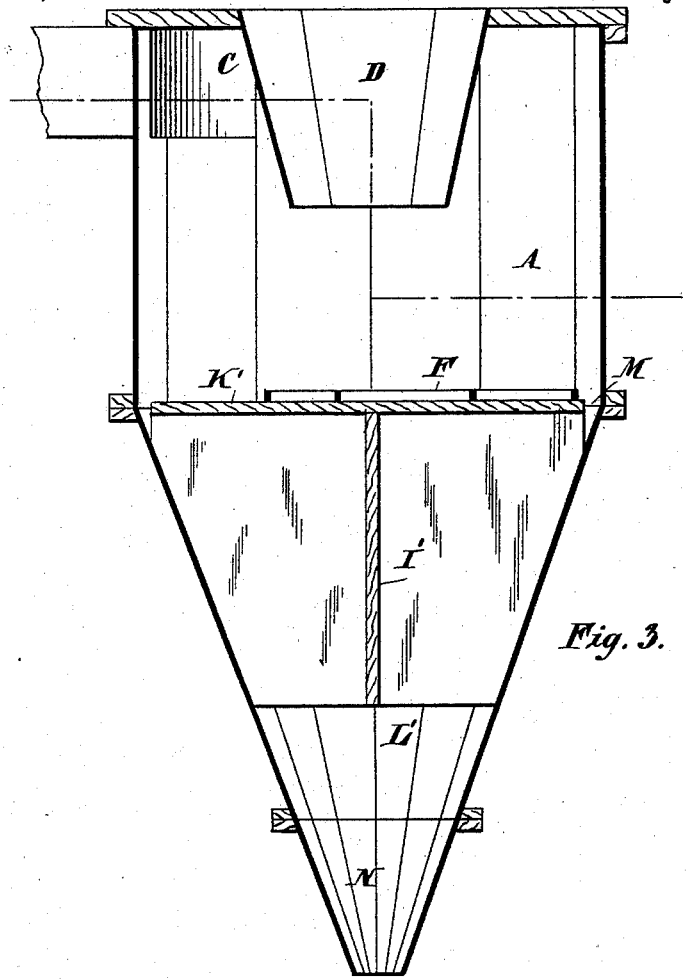
Figure 4:
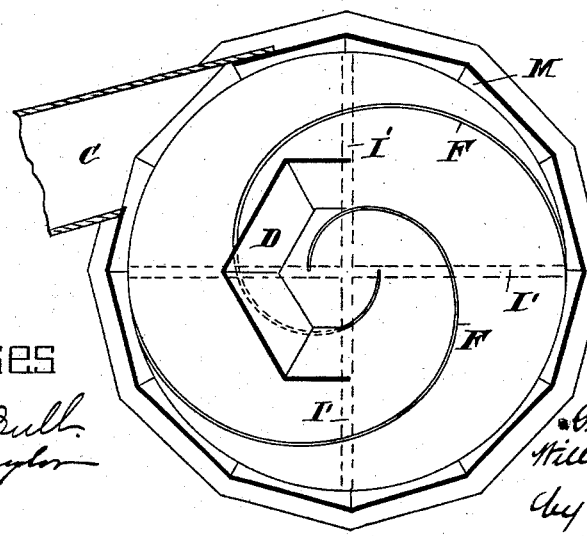

Figure 1 is a vertical section, and Fig. 2 a plan of our apparatus with the top removed; Figs. 3 and 4 similar views of a modified arrangement.

Referring first to Figs. 1 and 2—A, is a chamber cylindrical or polygonal; C, the usual tangential inlet for dust-laden air; D, exit for purified air; N, exit for dust; K, a disk, dividing the dust separating chamber A from the dust collecting chamber L below, leaving a narrow annular passage M all round for the dust to fall through; F, are volute ribs on the disk K guiding any dust that falls on the plate into the slot M. This disk K, in Figs. 1 and 2, is carried on spindle H and is made to slowly revolve, say one revolution a minute by worm and wheel J driven by pulley Q on shaft P. By making the disk rotate we avoid an accumulation which is liable to occur at certain points and thus cover and interfere with the proper action of the ribs upon the upper face of said disk. The dust falling upon the plate or disk at one point after another, is blown into the dust orifice, and each portion of said disk is perfectly clear by the time it reaches the point of maximum discharge.

I, I are arms or partitions on the shaft H dividing the dust chamber into two or more divisions and acting in the two-fold capacity of scrapers to scrape the dust into spout N and to prevent or stop the vertical motion of the dust. In order to prevent the dust accumulating in chamber L, the ring T is attached to arms I, keeping the dust on the outside. It is not, however, absolutely necessary, the machines working very well without it.

N is a spout, trapped by self-acting trap O, otherwise a powerful current of air would rush out: when, however, sufficient dust has accumulated in N to overcome the weight R of the weighted valve or door O, the latter opens and allows the dust to fall out, the weight then causes the valve to close.

In Figs. 3 and 4, in place of the scraping device and flat chamber L, we use a hopper L', polygonal as shown, or conical, and, in such case, prefer to support and hold disk K' by cross plates I' I'. These perform one of the uses of scrapers I, namely, stopping the vertical motion in the lower chamber L'.

The mode of action is as follows:—The dusty air entering at C rushes round and forms a vortex: the purified air escapes at D, the dust through annular slot M. The object of plates I' I', besides supporting the disk, is to prevent continued rotation and consequent comminution of the dust in the hopper. With the exception of these plates and the disk and the increased depth of prism A, the whole of Figs. 3 and 4 is the invention of Pieter Van Gelder, and set forth in patent application of Pieter Van Gelder now pending and assigned before issue to William Phillips Thompson. It is found, however, that, in machines made on the plan set forth in that specification and in conical machines generally, there is great loss of power and comminution of the dust through the long continued attrition of the latter in revolving round and round the cone in opposition to gravity, and it was found that, by simply adding the disk and plates I' I', the back pressure on the fan was reduced from one and one-fourth inch of water to about three-eighths and hardly a trace of fine dust escaped, whereas a considerable amount of fine dust escaped in the unaltered machine and a second story had to be put on to catch it, the said fine dust being formed from coarse dust by continual attrition in the cone. This defect is common to all conical dust collectors.

We declare that what we claim is—

1. In a dust separating machine, the combination of a substantially cylindrical separating chamber having a substantially tangential air inlet and an outlet for the purified air at the top of said chamber, and in which chamber the dust laden air forms a vortex; and an imperforate disk K at the bottom of said chamber, with an annular space between the edge of the disk and the wall of the separating chamber.

2. In a dust-separating machine, the combination with a substantially-cylindrical separating-chamber in which the dust-laden air forms a vortex, and in which the entire separation of the dust and air takes place; a tangential air inlet, and a central air exit at the top; and a dust-chamber at the opposite end, divided from the separating chamber by a central imperforate disk, said disk being smaller than the chamber so as to leave an annular passage all around the edge of the disk for the escape of the dust.

3. In a dust-collector, the combination of a cylindrical separating chamber; a dead-air dust-chamber; an imperforate disk arranged between the separating chamber and the dust chamber, with the edges of the disk set away from the wall of the separating chamber; and low ribs on said disk wholly below the inlet for guiding the dust that falls thereon, outward over the edges thereof.

4. In a dust separating machine, the combination of a substantially cylindrical separating chamber in which the dust-laden air forms a vortex, a disk K, chamber below connected with the separating chamber by means of an annular passage M, and means for rotating said disk K.

5. The combination, in a dust collector, of disk K, scrapers I, shaft H and means for revolving the same, substantially as and for the purposes described.

6. In combination with a dust collector, a revolving bottom plate K, an annular passage for dust around it, a scraping device rotating with said plate and spout N receiving the scrapings therefrom.

7. In a dust-collector, the combination of a substantially-cylindrical separating chamber; a central disk K; a dead-air dust-receiving chamber below said disk; a rotating scraping device in said dust-chamber; and a trapped spout in the floor of said dust chamber.

8. In combination with a separating chamber provided at one end with a tangential air inlet, and an outlet for the purified air, and at the opposite end with a dust outlet; a disk K at the base of the chamber; and a series of low ribs F applied to the upper face of said disk,—said ribs extending in substantially the same direction as that in which the tangential air current enters and the vortex revolves.

In testimony whereof we have signed our names to this specification in the presence of two subscribing witnesses.

WILLIAM PHILLIPS THOMPSON.
PIETER VAN GELDER.

Witnesses:
W. H. BEESTON,
JOHN McLACHLAN.